United States Patent
Zanetti (10) Patent No.: US 10,880,012 B2
(45) Date of Patent: Dec. 29, 2020

(54) OPTICAL TRANSMISSION SYSTEM

(71) Applicant: Luca Zanetti, Orlando, FL (US)

(72) Inventor: Luca Zanetti, Orlando, FL (US)

(*) Notice: Subject to any disclaimer, the term of this patent is extended or adjusted under 35 U.S.C. 154(b) by 0 days.

(21) Appl. No.: 16/928,641

(22) Filed: Jul. 14, 2020

(65) Prior Publication Data

US 2020/0343976 A1 Oct. 29, 2020

Related U.S. Application Data

(60) Provisional application No. 63/036,256, filed on Jun. 8, 2020.

(51) Int. Cl.
| | | |
|---|---|---|
| *H04B 10/40* | (2013.01) | |
| *G02B 6/28* | (2006.01) | |
| *H04B 10/25* | (2013.01) | |
| *H04B 10/50* | (2013.01) | |

(52) U.S. Cl.
CPC ............... *H04B 10/40* (2013.01); *G02B 6/28* (2013.01); *H04B 10/25* (2013.01); *H04B 10/503* (2013.01)

(58) Field of Classification Search
CPC combination set(s) only.
See application file for complete search history.

(56) References Cited

U.S. PATENT DOCUMENTS

| 2013/0129340 A1* | 5/2013 | Coli | H04B 10/038 |
| | | | 398/2 |
| 2014/0178015 A1* | 6/2014 | Tong | G02B 6/4284 |
| | | | 385/88 |
| 2017/0047997 A1* | 2/2017 | Chen | H04B 10/503 |
| 2018/0213305 A1* | 7/2018 | Campos | H04J 14/0257 |

\* cited by examiner

*Primary Examiner* — Omar S Ismail
(74) *Attorney, Agent, or Firm* — Barry Choobin; Patent 360

(57) ABSTRACT

The present disclosure is directed to an optical transmission system including an optical transmitter and an optical receiver. The optical transmitter including a transmitting circuitry configured to receive electrical signals from a source device; at least one laser configured into the transmitting circuitry for converting the electrical signals into light signals; a first interface electrically connected to the transmitting circuitry and configured to connect the transmitting circuitry to the source device; and a plurality of optical connectors connected to the transmitting circuitry for receiving the light signals, the plurality of optical connectors configured to removably connect to a plurality of transmitting optical fibers for transmitting light signals. The optical receiver including a receiving circuitry configured to receive the light signals from the transmitting optical fibers and convert the light signals into the electrical signals.

15 Claims, 8 Drawing Sheets

OPTICAL TRANSMISSION SYSTEM

CROSS-REFERENCE TO RELATED APPLICATIONS

This application claims priority to the U.S. provisional patent application Ser. No. 63/036,256 filed on Jun. 8, 2020, which is incorporated herein by reference in its entirety.

FIELD OF INVENTION

The present disclosure relates to an optical fiber transmission system, and particularly, relates to an optical transmitter and an optical receiver.

BACKGROUND

Video distribution through drywalls over wall plates today requires custom large circuits behind the wall plates, also called HDMI wall plate extenders, which are complex, expensive, and require in-wall wiring to a permanent power supply, creating in-wall heating and continuous electricity consumption on the monthly bill. Also, these "HDMI wall plate extenders" usually works over CAT-5, 6, 7, or 8 copper cables which require the video quality to be compressed as no CAT-x cable can offer the new video bandwidth of 48 gigabits per second required by the 4K+HD 120FPS or the new 8K HDMI 2.1.

Thus, a need is appreciated for a transmission system that can transfer copious amounts of data over long distances without any signification attenuation and could be used to transmit uncompressed high bandwidth video data.

SUMMARY OF THE INVENTION

The principal object of the present invention is therefore directed to an optical transmission system for high-speed transmission of uncompressed video data over long distances.

In one aspect disclosed herein is an optical transmission system that includes an optical transmitter and an optical receiver. The optical transmitter can receive electrical signals from a source device and converts the electrical signals to light signals for transmission through optical fibers. The optical receiver can receive the light signals from the optical fiber and converts the light signals to electrical signals for the target media device.

In one aspect, the optical transmission system disclosed herein can be powered directly from the source device, and thus consumes power only when in use. This saves energy, and the system does not unnecessary heats up.

In one aspect, the optical transmitter comprises a transmitting circuitry, the first interface for coupling with the source device, and a vertical-cavity surface-emitting laser (VCSEL) that converts the electrical signals from the source device into light signals. In one case, the first interface can be an HDMI interface for receiving HDMI electrical signals. In one case, the first interface can be a USB interface for receiving USB electrical signals.

In one case, the optical receiver comprises a receiving circuitry for converting the light signals back to the electrical signals, a second interface for coupling the receiving circuitry with the target device. In one case, the second interface is the same as the first interface. For example, the second interface is also HDMI when the first interface is HDMI.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Figure 1:
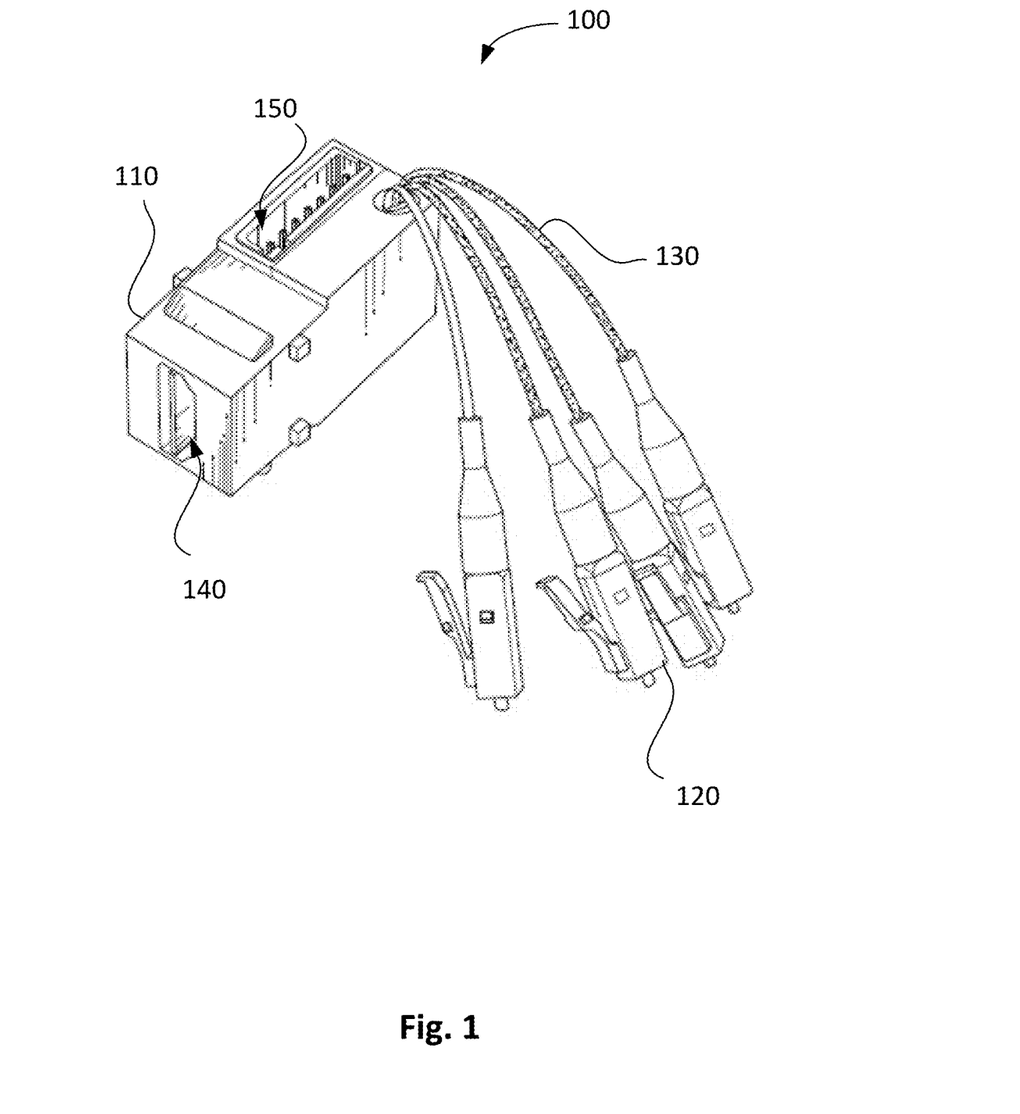
FIG. 1 is a perspective view of an optical transmitter having an HDMI interface, according to an embodiment of the present invention.

Now referring to FIG. 1, which is a perspective view of an optical transmitter 100 according to one implementation of the present invention. The optical transmitter 100 is shown to include a housing 110 enclosing a transmitting circuitry and laser. The optical transmitter 100 provides for high bandwidth data transfer over long distances, for example, 1000 feet and more without any lag. The optical transmitter 100 can transfer full speed uncompressed video data through optical fiber cables. The optical transmitter 100 can be powered by the source device, for example, set-top box. In one implementation, the laser can be VCSEL laser technology that can convert the HDMI or USB electrical signals to light signals. The optical fibers offer negligible attenuation to the light signals up to 1000 feet, thus permitting 4K plus resolution uncompressed video data to be transmitted for more than 1000 feet without any significant lag. It is to be noted that any other laser known to a skilled person for converting electrical signals into light signals for transmitting the light signals through optical fiber cables can be used without departing from the scope of the present invention. Besides lasers, any technology known to a skilled person for converting electrical signals into light signals for transmitting the light signals through optical fiber cables can be used without departing from the scope of the present invention.

In one aspect, the optical transmitter 100 can transmit audio & video data and control signals through optical fiber cables. Also, the optical transmitter 100 consumer comparatively very much less power than conventional HDMI extenders and thus can be powered by the source device itself. Thus, the optical transmitter 100 only consumes electricity when in use, saving energy.

Referring to FIG. 1, four optical connectors 120 can be seen extending from the housing 110. The optical connectors 120 can be removably connected to any standard optical fiber cable, thus making the disclosed optical transmission system versatile. The connectors 120 allow the standard optical fiber cable to be removed and replaced. The standard optical fiber cable can be any commercially available optical fiber cables that can be provided with connectors compatible with the connectors 120 of optical transmitter 100. For example, LC OM3 connectors, as shown in FIG. 1, can be used that are both economically and easily available. The connectors 120 are shown to be connected to the transmitting circuitry through optical fiber cables 130 that are shown to be coming out of the housing 110 so these are already turned to go "UP" into the electrical conduits, avoiding the risk to bend and break the fibers when closing the wall plate to the wall-plate box. The housing 110 is compact, so it can fit into any existing wall-mount keystone box or a wall-plate without requiring modifications. The housing 110 can be made of plastic, metal, and like material. Preferably, the material of the housing can provide a shield against EMI interferences. Alternatively, a layer of such material can be provided over the housing to isolate the interference. Moreover, the housing is dimensioned to easily fit to a standard wall plate. The HDMI interface or the USB interface can register with a keystone of a standard wall plate. The optical transmitter or the optical receiver, disclosed herein, are compatible with most of the standard wall plated commercially available. The housing with external optical connectors is compact enough to easily fit into a standard wall plate.

Figure 2:
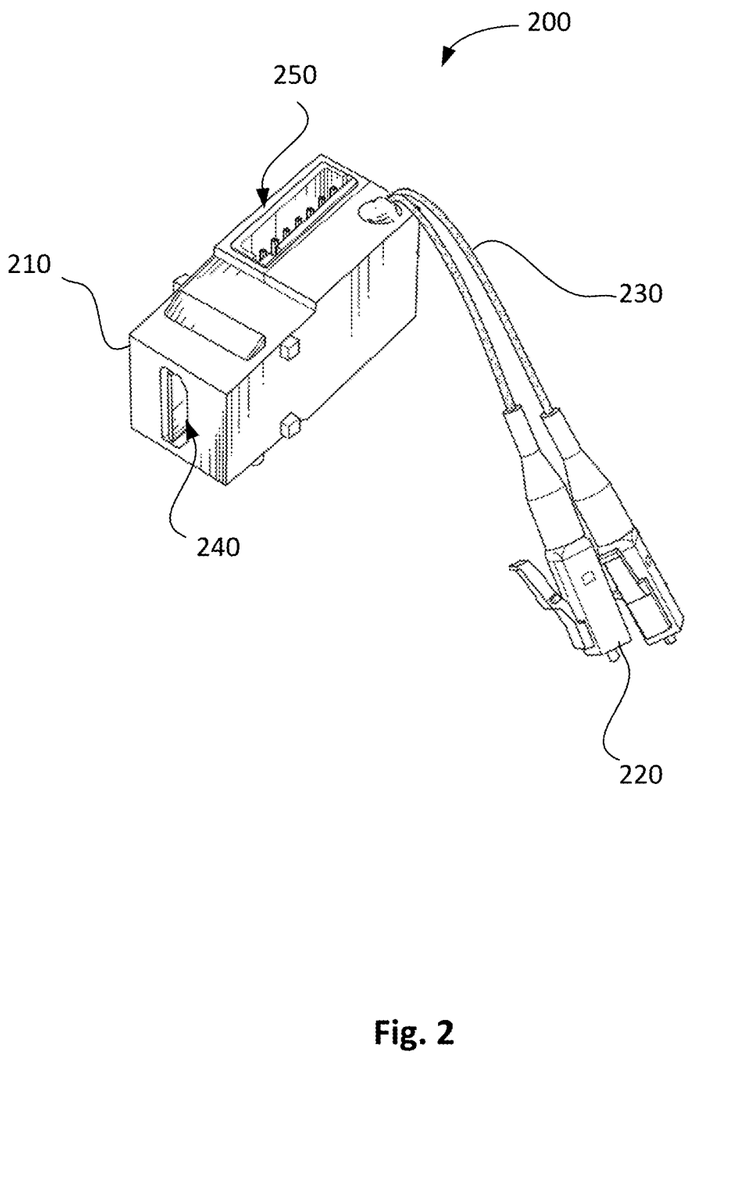
FIG. 2 is a perspective view of an optical transmitter having a USB interface, according to an embodiment of the present invention.

An interface 140 shown in FIG. 1 which is an HDMI interface that can receive a male HDMI connector that extends from the source device. The interface 140 can be any interface depending upon the output of the source device, such as a USB interface. Furthermore, it can be seen in FIG. 1 is a port 150 having seven electrical pins. FIG. 2 shows another implementation of the optical transmitter 200 having a housing 210, a pair of optical connectors 220 that extends from the housing 210, the pair of optical connectors 220 connected to a transmitting circuitry through a pair of optical fibers 230. The optical transmitter 200 is having a USB interface 240 instead of the HDMI interface shown in FIG. 1. Also, unlike the four optical connectors for HDMI, two optical connectors 220 can transmit the bitrate of the latest USB 3.$x$ and coming 4.$x$ standards. The number of connectors depends upon input from the source device, and the number of connectors can vary without departing from the scope of the present invention. Furthermore, port 250 is also shown that is having seven electrical pins.

Figure 3:
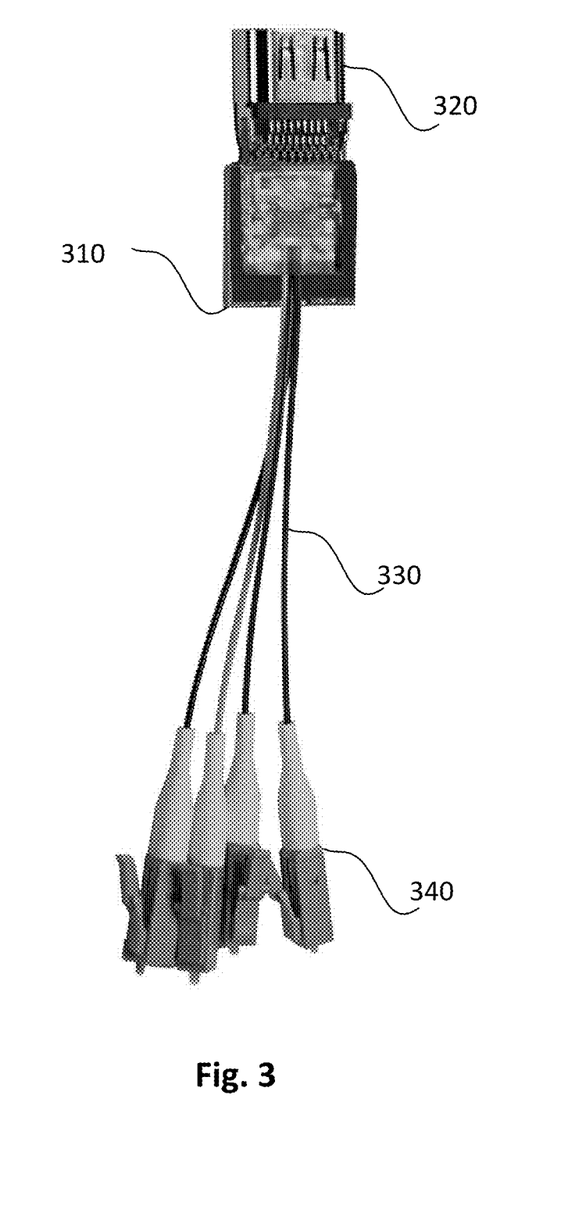
FIG. 3 shows a transmitting circuitry of the optical transmitter of FIG. 1, according to an embodiment of the present invention.
Figure 4:
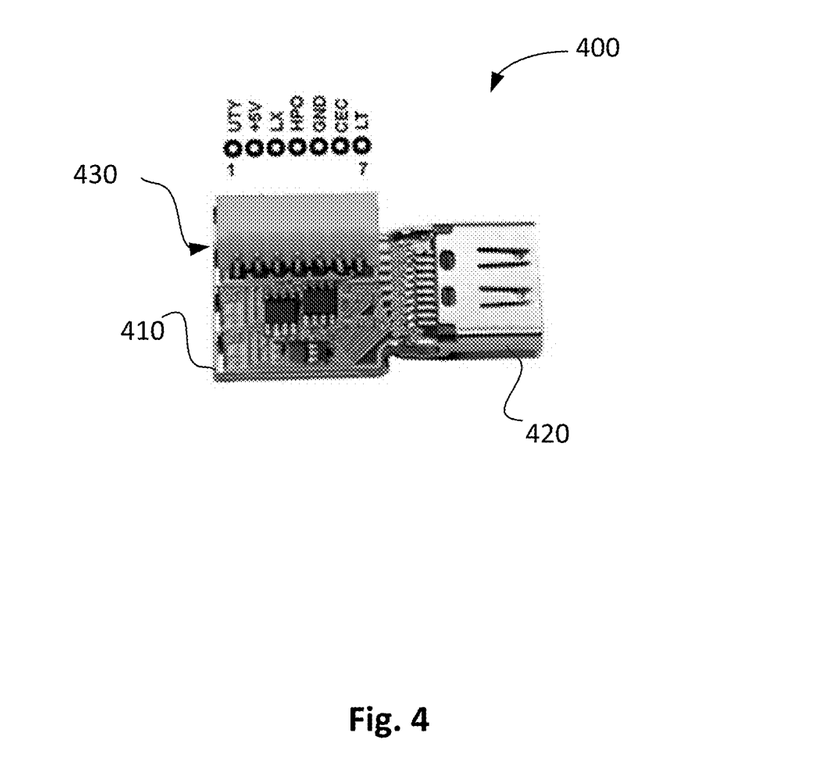
FIG. 4 shows the transmitting circuitry of FIG. 3 having seven electrical pins, according to an embodiment of the present invention.
Figure 6:
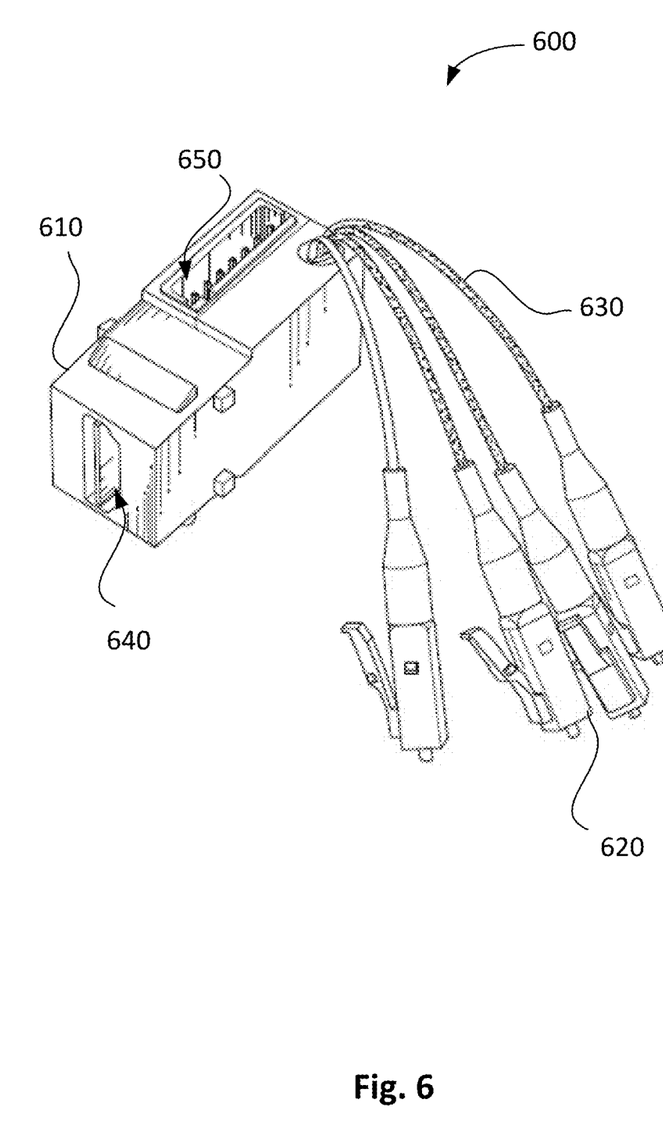
FIG. 6 is a perspective view of an optical receiver having a HDMI interface, according to an embodiment of the present invention.

FIG. 3 shows the transmitting circuitry 310 of the optical transmitter 100. The HDMI interface 320 is shown connected to the transmitting circuitry 310. Furthermore, the four connectors 340 are connected to the circuitry 310 through four optical cables 330. FIG. 4 is the transmitting circuitry 400 of the optical transmitter 100 further showing the seven electrical pins of the port 150 shown in FIG. 1. FIG. 4 also shows the HDMI interface 420. The seven electrical pins allow communication between the optical transmitter and an optical receiver. An embodiment of the optical receiver is shown in FIG. 6.

The optical receiver 600 is shown to be like the optical transmitter 100 of FIG. 1. The optical receiver 600 is having a housing 610 that can be made of plastic, metal, and like material. Preferably, the material of the housing can provide a shield against EMI interferences. Alternatively, a layer of such material can be provided over the housing to isolate the interference. The optical receiver 600 also includes four optical connectors 620 that are connected to the receiving circuitry through four optical fibers 630. The optical connectors 620 can be like the optical connectors 120 of the optical transmitter 100 and can be removably connected to the optical fiber cable for receiving the light signals transmitted by the optical transmitter 100.

The receiving circuitry can convert the light signals received from the optical transmitter 100 back into the electrical signals. The output electrical signals from the optical receiver can be the same as the input electrical signals from the source device received by the optical transmitter 100. The optical receiver 600 also has an HDMI interface 640 for connecting to the target device, wherein the type of interface is the same as the interface of the optical transmitter 100. For example, a standard HDMI cable having opposite male ends can connect at one end to the optical receiver 600 and the other end of the HDMI cable can be connected to the target device. The target device can be a TV, monitor, projector, and like electrical device. The optical receiver 600 is also having a port 650 that includes seven electrical pins like the transmitting circuitry 400.

Referring to FIG. 4, the seven pins 430 allows connecting the optical transmitter 100 and the optical receiver 600 through electrical lines for sharing data. For example, control signals can be transmitted through these electrical lines. Also, the port 150 and 650 with standard electrical pins can be used to power the optical transmitter and the optical receiver, as disclosed herein. However, the ports can be optional, and the control signals can be transmitted through optical fibers itself, and the optical transmitter and the optical receiver can be powered by the source device. However, in case the source device cannot provide the needed power or voltage, an external power source can be provided without departing from the scope of the present disclosure.

FIG. 4 shows the transmitting circuitry 400 having seven pins. However, the number of pins can be varied depending upon the utility of the optical transmission system, disclosed herein. Seven electrical pins are a standard that allows all the features of an HDMI up to the actual HDMI 2.1 full specifications. The electrical pins also allow powering the optical receiver 600 by the optical transmitter 100, wherein the optical transmitter 100 can be powered by the source device or an external power supply. Additional signaling pins can provide additional functionality, such as controlling the optical splitter boxes or optical matrixes boxes. The optical splitter boxes can allow building interconnected uncompressed fiber optic-based multi-sources and multi-screens 4 k, 8 k, 10 k, and higher uncompressed zero-lag video distribution systems.

In one implementation, the optical transmission system disclosed herein can incorporate single-mode or multi-mode transmission based upon the distance to be covered. Also, the type of the optical fibers used can be varied depending upon the desired bandwidth and the distance covered. Single-mode and multi-mode transmissions are known in the art.

Figure 5:
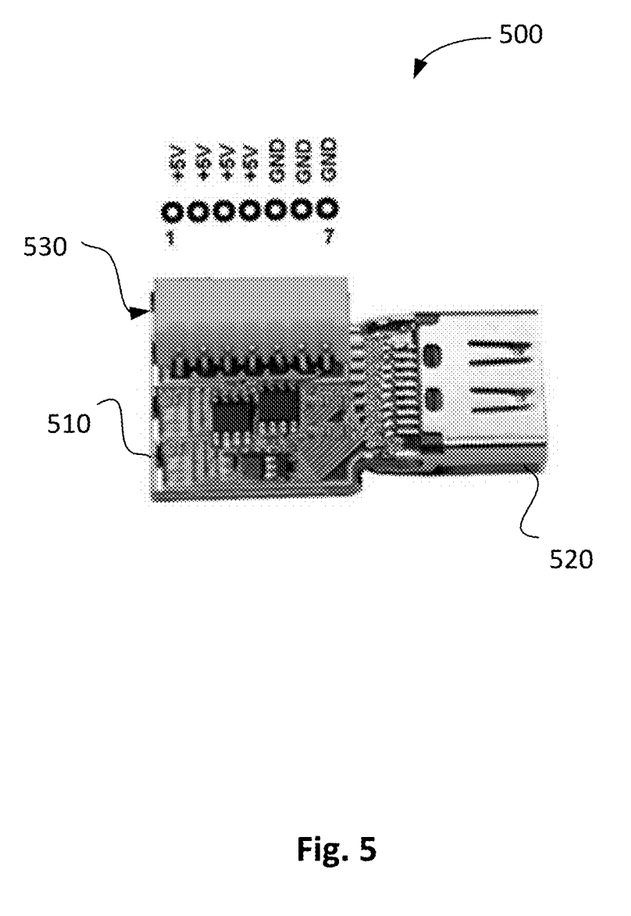
FIG. 5 shows a transmitting circuitry of the optical transmitter of FIG. 2, according to an embodiment of the present invention.

FIG. 5 shows the transmitting circuitry 500 for USB data transmission. The transmitting circuitry 500 is shown connected to the USB interface 520. The transmitting circuitry 500 is having typical seven electrical pins 530 numbered 1 to 7 to bridge enough power from the optical transmitter to the optical receiver. The optical transmitter can be powered by the source device, such as a laptop computer or a gaming console. However, an external power supply can be provided wherein the source device can be power the optical transmitter. Additional pins can be added for added functionality, such as controlling interconnected optical splitter boxes or optical matrixes boxes to build uncompressed fiber optic-based multi-USB sources/destination HUB NETWORK with uncompressed zero-lag USB data distribution systems.

Figure 7:
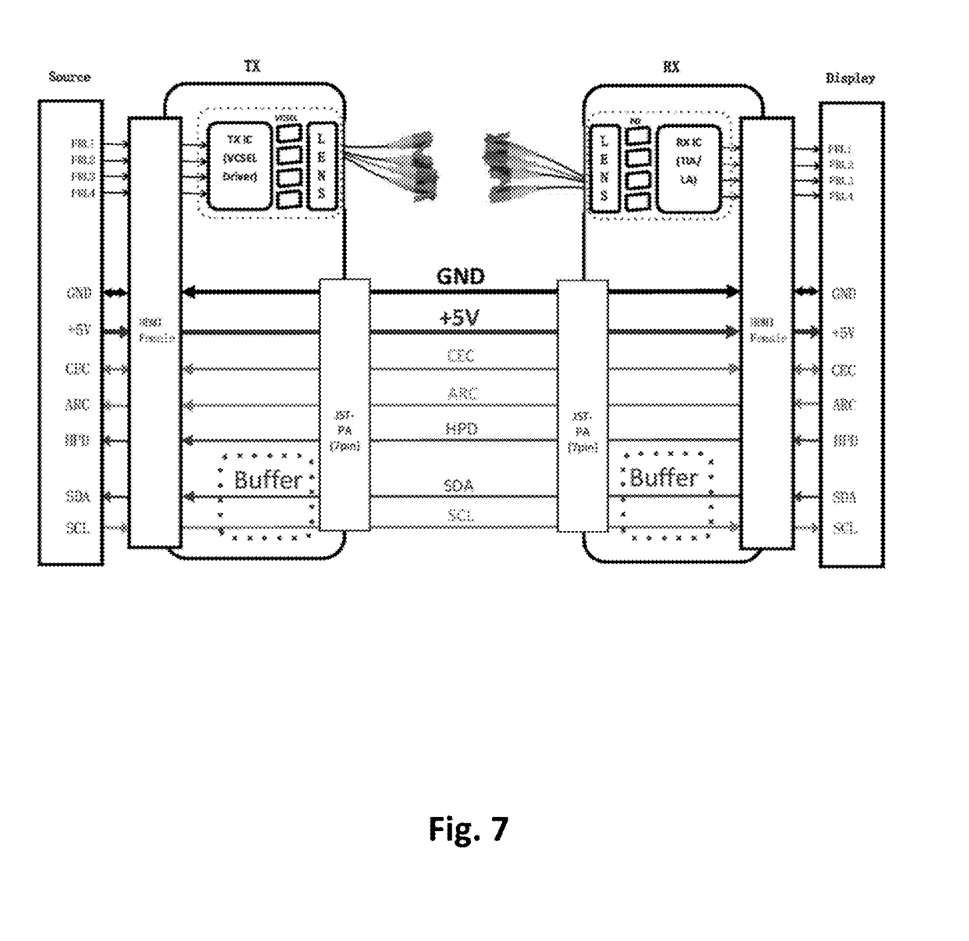
FIG. 7 is a block diagram showing the HDMI based optical transmission system having the optical transmitter and the optical receiver, according to an embodiment of the present invention.
Figure 8:
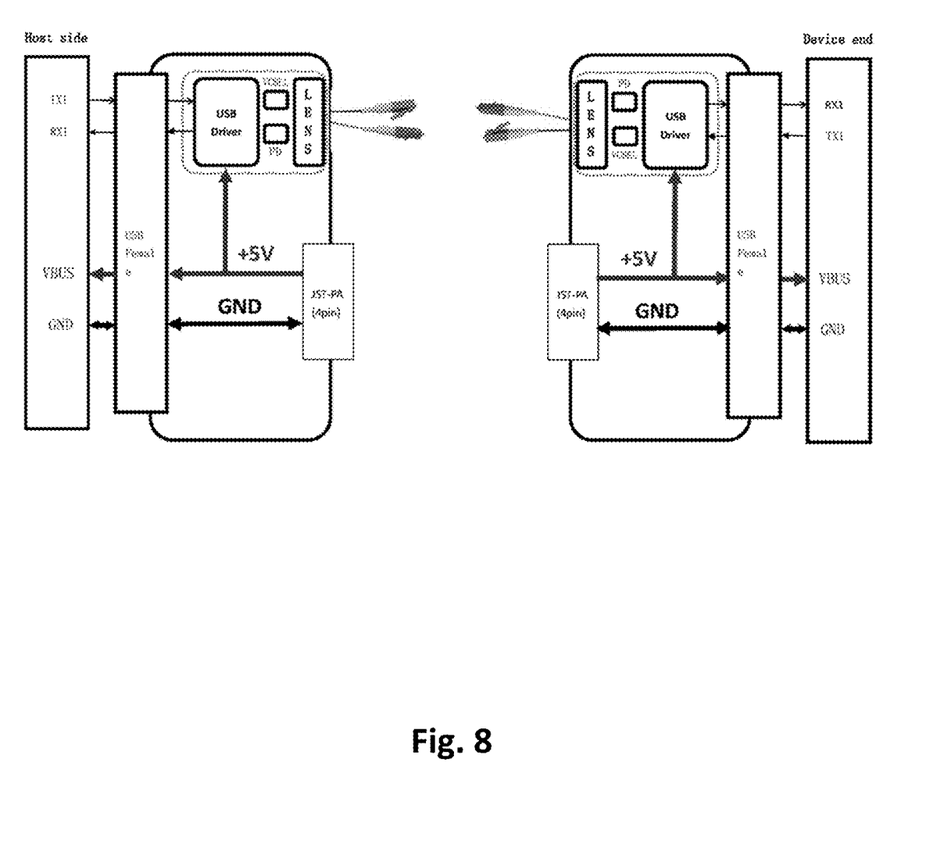
FIG. 8 is a block diagram showing the USB based optical transmission system having the optical transmitter and the optical receiver, according to an embodiment of the present invention.

FIG. 7 is a block diagram of the HDMI based optical transmission system showing the optical transmitter (TX) connected to a source device through HDMI interface. The receiver (RX) is connected to a display through the HDMI interface. The optical transmitter having four lasers (VS-CEL) for electrical to light signal conversion. Four optical connectors for removably connecting to four optical fiber cables. Further shown in FIG. 7 are seven electric wires including the data on Serial Data Line (SDA) and Serial Clock Line (SCL) and on Customer Electronics Control (CEC), Audio return cable (ARC), and hot plug detect (HPD). FIG. 8 shows the optical transmission system for USB data including the optical transmitter connected to a host device and the receiver connected to a device.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An optical transmission system comprising:
   an optical transmitter comprising:
      a housing configured as a keystone jack;
      a transmitting circuitry enclosed in the housing and configured to receive electrical signals from a source device;
      a first interface electrically connected to the transmitting circuitry and configured to connect the transmitting circuitry to the source device;
      at least one laser configured into the transmitting circuitry for converting the electrical signals into light signals; and
      a plurality of first optical connectors connected to the transmitting circuitry through a plurality of optical fiber cables for receiving the light signals, the plurality of first optical connectors configured to removably connect to a plurality of transmitting optical fibers for transmitting the light signals,
      wherein the plurality of optical fiber cables extend from the housing,
      wherein the transmitting circuitry further comprises a plurality of first electrical pins configured for electrically connecting the transmitting circuitry to a receiving circuitry.

2. The optical transmission system of claim 1, wherein the optical transmission system further comprises:
   an optical receiver comprising:
      a second housing configured as a keystone jack;
      the receiving circuitry enclosed in the second housing and configured to receive the light signals and convert the light signals into the electrical signals;
      a second interface electrically connected to the receiving circuitry and configured to connect the receiving circuitry to a target device for transmitting the electrical signals to the target device; and
      a plurality of second optical connectors connected to the receiving circuitry through a plurality of second optical fiber cables, the plurality of second optical connectors configured to removably connect to the plurality of transmitting optical fibers for receiving the light signals
      wherein the plurality of second optical fiber cables extend from the housing,
      wherein the receiving circuitry further comprises a plurality of second electrical pins configured for electrically connecting the receiving circuitry with the plurality of first pins of the transmitting circuitry.

3. The optical transmission system of claim 2, wherein the first interface and the second interface are HDMI interfaces.

4. The optical transmission system of claim 2, wherein the first interface and the second interface are USB interfaces.

5. The optical transmission system of claim 2, wherein at least one of the plurality of second electrical pins is configured to power the optical receiver by the optical transmitter.

6. The optical transmission system of claim 5, wherein the optical transmitter is powered by the source device.

7. The optical transmission system of claim 1, wherein at least one of the plurality of first electrical pins is configured to transmit control signals.

8. The optical transmission system of claim 1, wherein the at least one laser is vertical-cavity surface-emitting laser.

9. The optical transmission system of claim 3, wherein the plurality of first optical connectors are four in number and the plurality of second optical connectors are four in number.

10. The optical transmission system of claim 3, wherein the plurality of first optical connectors are connected to the transmitting circuitry through four first optical fibers, and the plurality of second optical connectors are connected to the receiving circuitry through four first optical fibers.

11. The optical transmission system of claim 4, wherein the plurality of first optical connectors are two in number and the plurality of second optical connectors are two in number.

12. The optical transmission system of claim 11, wherein the plurality of first optical connectors are connected to the transmitting circuitry through two first optical fibers, and the plurality of second optical connectors are connected to the receiving circuitry through two first optical fibers.

13. An optical transmission system comprising:
an optical transmitter comprising:
  a transmitting circuitry configured to receive electrical signals from a source device;
  a first interface electrically connected to the transmitting circuitry and configured to connect the transmitting circuitry to the source device;
  at least one laser configured into the transmitting circuitry for converting the electrical signals into light signals;
  a plurality of first optical connectors connected to the transmitting circuitry for receiving the light signals, the plurality of first optical connectors configured to removably connect to a plurality of transmitting optical fibers for transmitting light signals; and
an optical receiver comprising:
  a receiving circuitry configured to receive the light signals and convert the light signals into the electrical signals;
  a second interface electrically connected to the receiving circuitry and configured to connect the receiving circuitry to a target device for transmitting the electrical signals to the target device;
  a plurality of second optical connectors connected to the receiving circuitry, the plurality of second optical connectors configured to removably connect to the plurality of transmitting optical fibers for receiving the light signals,
wherein each of the transmitting circuitry and the receiving circuitry further comprises seven electrical pins for electrically connecting the transmitting circuitry with the receiving circuitry.

14. An optical transmission system comprising:
an optical transmitter comprising:
  a transmitting circuitry configured to receive electrical signals from a source device;
  a first interface electrically connected to the transmitting circuitry and configured to connect the transmitting circuitry to the source device;
  at least one laser configured into the transmitting circuitry for converting the electrical signals into light signals;
  a plurality of first optical connectors connected to the transmitting circuitry for receiving the light signals, the plurality of first optical connectors configured to removably connect to a plurality of transmitting optical fibers for transmitting light signals; and
an optical receiver comprising:
  a receiving circuitry configured to receive the light signals and convert the light signals into the electrical signals;
  a second interface electrically connected to the receiving circuitry and configured to connect the receiving circuitry to a target device for transmitting the electrical signals to the target device;
  a plurality of second optical connectors connected to the receiving circuitry, the plurality of second optical connectors configured to removably connect to the plurality of transmitting optical fibers for receiving the light signals,
wherein each the transmitting circuitry and the receiving circuitry further comprises a plurality of electrical pins for electrically connecting the transmitting circuitry with the receiving circuitry,
wherein at least one of the plurality of electrical pins is configured to control an optical splitter box.

15. The optical transmission system of claim 1, wherein the optical transmitter is configured to transmit the light signals up to 1000 feet.

* * * * *